United States Patent Office 2,837,510
Patented June 3, 1958

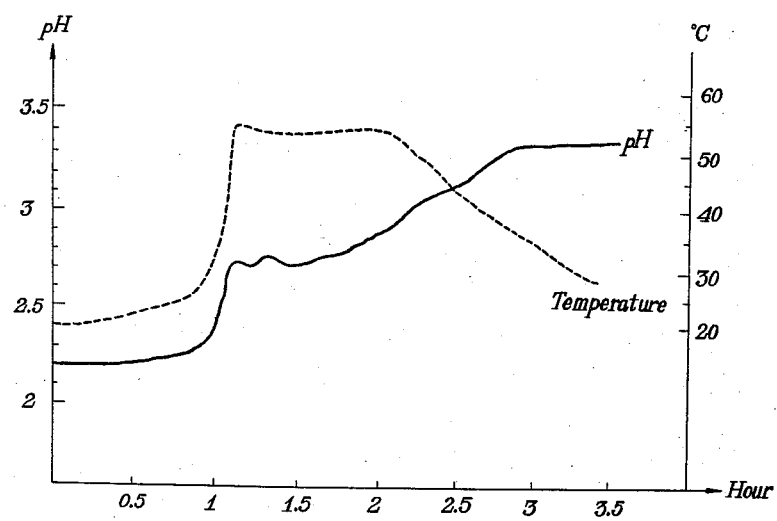

2,837,510
PROCESS FOR PREPARING DIHYDRODESOXY-STREPTOMYCIN

Teijiro Yabuta, Hiroshi Ikeda, and Kenji Shiroyanagi, Tokyo, Hatsuko Ikeda, Fujisawa, and Itsuo Fujimaki, Mitsuhiko Katayama, Kei-ichi Tsuji, and Tomonori Sato, Tokyo, Japan Application March 4, 1957, Serial No. 643,560

Claims priority, application Japan January 19, 1957

4 Claims. (Cl. 260—210)

This invention relates to an improved process for preparing a very potent antibiotic substance for the chemotherapy of tuberculosis, dihydrodesoxystreptomycin, by the reduction of acid salts of streptomycin with amalgamated aluminum.

It is known (Peck et al., J. Am. Chem. Soc. 68, 1390, 1946; Bartz et al., ibid., 68, 2163, 1946; Carboni and Regna, U. S. Patent 2,522,858, 1950; Peck, U. S. Patent 2,498,574, 1950) that when an acid addition salt of streptomycin is subjected to catalytic hydrogenation, one mole of hydrogen per mole of streptomycin is taken up, and that the resulting dihydrostreptomycin or acid addition salt thereof is antibiotically active and is suitable for clinical application. An electrochemical procedure (Ohdake et al., Repts. Sci. Research Inst., Japan, 28, 103, 1952), and a sodium borohydride method (Kaplan et al., J. Am. Chem. Soc. 76, 5161, 1954), for the reduction of streptomycin to dihydrostreptomycin have also been reported.

We have described in "Proceedings of the Japan Academy," vol. 32, 48, 1956 (Chem. Abst., vol. 50, 13,765, 1956), that streptomycin has been treated with amalgamated aluminum in an aqueous medium, at pH 2.2, to give a new reduction product, dihydrodesoxystreptomycin. The characterization of this new compound also was described and evidence was presented indicating the differences between dihydrodesoxystreptomycin and dihydrostreptomycin in their properties.

The structure of dihydrodesoxystreptomycin was elucidated as described below (H. Ikeda et al., Proceedings of the Japan Academy, vol. 32, 52, 1956).

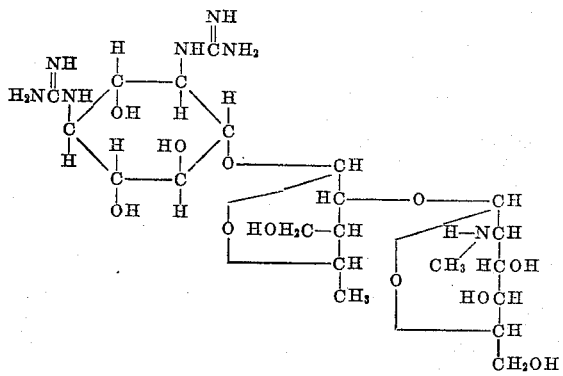

Since the new compound is distinct from the known types of streptomycin and differs from dihydrostreptomycin by the fact that the tertiary hydroxy group of dihydrostreptomycin is reduced to hydrogen, it is given the name "dihydrodesoxystreptomycin."

Subsequently, as a result of animal and clinical tests, it has been found that this compound is a very potent agent for the chemotherapy of tuberculosis and has no side effects.

The preparation method of dihydrodesoxystreptomycin described in the above literature (Proc. Japan Academy) appears to be method of a laboratory type; none appears to give high yields of product desirable in a large-scale commercial operation.

In the co-pending application, Serial No. 500,306, filed April 8, 1955, now Pat. No. 2,803,650, a process is disclosed for preparing dihydrodesoxystreptomycin by treating a streptomycin salt with amalgamated aluminum in an aqueous or solvent medium at the pH range from 2.0 to 2.5.

Later on, the present inventors have developed their researches to reduce streptomycin with amalgamated aluminum under various conditions, and, having observed that the above-mentioned method (Serial No. 500,306, now Pat. No. 2,803,650) is being accompanied by certain disadvantages in order to be adopted for an industrial production, have now come to invent a more superior method which is explained in detail hereunder.

It is one object of our invention to provide an improved and economical method of preparing dihydrodesoxystreptomycin.

It is a further object of our invention to provide a method of preparing a high yield of dihydrodesoxystreptomycin of high purity.

Other objects and advantages of our invention will be apparent from the following description.

First, we will state about the experiment from which the present invention has been brought about. While reacting the aqueous solution of streptomycin sulfate by adding amalgamated aluminum, we have conducted a minute observation of the change of pH of the reaction mixture with a pH meter and a micro-meter connected thereto. The appended figure is a diagram as recorded by the micrometer.

We shall now give a detailed explanation about this experiment. The aqueous solution of streptomycin sulfate, with the pH of the solution adjusted to 1.5–2.4 by the addition of sulfuric acid, is reacted with amalgamated aluminum added thereto and agitated (the first stage of reaction).

During this first stage of reaction, the rising rate of the pH of the reaction mixture tends to be very high. In other words, pH will rise immediately unless the pH of the reaction mixture is properly adjusted. Therefore, the adjustment of the pH must be executed very carefully during this stage. As the reaction is developed in this manner, the reaction will begin to be extremely vigorous during the process (about one hour after in the case of appended figure) and the temperature will advance abruptly and would attain at 80°–90° if left alone, causing streptomycin to be destroyed. Therefore, the reaction should be effected at the temperature being kept at 50–55° C. by cooling (the last stage of reaction). During this while, the most remarkable point is that the rising rate of pH becomes very inactive at the last stage of reaction where the reaction goes vigorously compared with the first stage of reaction. However, it has been observed that, in order to keep the pH of the reaction mixture always at 1.5–2.4 during this stage, more quantity of sulfuric acid is required than at the first stage.

Besides the above-mentioned facts, in connection with the last stage of reaction, the present inventors have also found that a large quantity of sulfuric acid is required to lower the pH of the reaction mixture below 2.7—this phenomenon is considered to take place as a buffer action of aluminum sulfate that originates in the reaction mixture as a by-product—and that in order to adjust and maintain pH at 2.7–3.5 for the last stage of reaction, a comparatively smaller quantity of sulfuric acid is enough than for the first stage of reaction, and, furthermore, that even if the reaction is developed with pH maintained within the scope of 2.7–3.5, the purity of dihydrodesoxystreptomycin obtainable after the reaction is not different from that of the compound obtainable by the method of said co-pending application Serial No. 500,306.

We have also made an experiment to adjust the pH to 2.7–3.5 for the first stage of reaction just as for the last stage of reaction—namely, the experiment to adjust the pH to 2.7–3.5 through all the stages of reaction. In this case, the resulting dihydrodesoxystreptomycin will be mixed by about 20% of dihydrostreptomycin. Of course, it is true that even from such an impure mixture, we may also be able to obtain dihydrodesoxystreptomycin of higher quality if we treat it as a free base and repeat recrystallization. However, taking everything into account, the yield will become excessively decreased if this measure is taken. So it is necessary to adjust the pH to 1.5–2.4 for the first stage of reaction, as is the case with the present invention.

Again, we have made an experiment to adjust the pH to 3.5–7.0 for the last stage of reaction, and in this case too, we have found that about 15% of dihydrostreptomycin is left to be mixed, causing the yield of dihydrodesoxystreptomycin to decrease. Thus, in the last stage of reaction, too, pH must be adjusted to 2.7–3.5, as is proved by the present invention.

These facts as observed in the above-mentioned experiments are the most important points that constitute the present invention. Reflecting upon the case of the method of said co-pending application Serial No. 500,306, now Pat. No. 2,803,650, from this point, it was necessary to consume an extremely great quantity of sulfuric acid to adjust pH as a result of pH being adjusted to 1.5–2.5 through all the stages of reaction. For instance, if the quantity of sulfuric acid required for the adjustment of pH in the present invention is represented by 100, the quantity of sulfuric acid required in the method of said co-pending application Serial No. 500,306, now Pat. No. 2,803,650, will have to be represented by as many as 250–300.

As a result that such a great quantity of sulfuric acid is required for the adjustment of pH, it has been ascertained that the method of said co-pending application Serial No. 500,306 has to suffer from several disadvantages, namely:

(1) Removal of excess sulfuric acid will become difficult and therefore the decrease of the yield will result.

(2) As a result of the use of too much quantity of sulfuric acid, a part of the material streptomycin will be decomposed. (This is especially observed when more than 1 kg. of streptomycin is reduced.) Accordingly, this will cause decrease of the yield and debasement of the quality of the resulting dihydrodesoxystreptomycin.

As stated above, the method of said co-pending application Serial No. 500,306, now Pat. No. 2,803,650, has not undergone minute researches about the changes in the process of this reductive reaction, but only effected a stabilization of pH, with the result that the method came upon these disadvantages as mentioned above. However, it can be seen from the above explanation that a synthetic utilization of the above-mentioned facts in connection with this reaction, as experimented and observed by the present inventors, will remove all the defects contained in the method of said co-pending application Serial No. 500,306, now Pat. No. 2,803,650, and will make it possible to manufacture a good quality dihydrodesoxystreptomycin in a simple manner and with high yield.

The present inventors, taking advantage of the above-mentioned facts which they have discovered, have invented the following method to manufacture dihydrodesoxystreptomycin on an industrial scale. Namely, keeping the pH at 1.5–2.4 by adding acids to the aqueous solution of sterptomycin salt, and then by adding amalgamated aluminum, the reaction is caused to take place (the first stage of reaction). When the reaction becomes very vigorous during the process, the pH will be adjusted and maintained at 2.7–3.5 and the reaction will be effected with the temperature kept within the scope of 50–55° C. (the last stage of reaction). Subsequently, when the result of maltol assay shows that the residual streptomycin has become less than 1%, the reaction will be stopped, and the reaction mixture will be filtered. Then, with the addition of acetone to the filtrate from which the acid had been removed, a free base of dihydrodesoxystreptomycin will be separated in the form of soft needle crystals. These crystals of the free base will be neutralized with dilute sulfuric acid, and the aqueous solution will be lyophilized, or added by methyl alcohol, and then dihydrodesoxystreptomycin sulfate can be obtained.

The nitrate, hydrochloride, phosphate, etc. of dihydrodesoxystreptomycin may also be prepared by the same method as stated above. By the way, if streptomycin sulfate is used as a starting material and pH is adjusted with sulfuric acid, the surplus of which being removed with barium hydroxide after the reaction, and the filtrate whose pH is kept at 6.0 is concentrated, and added by methyl alcohol, dihydrodesoxystreptomycin sulfate may also be obtained. However, the compound thus obtained sometimes contains a very small quantity of impurities.

In the method of our invention, the desirable temperature of the reaction mixture at the beginning of the reaction is generally 20–25°, because the vigorous reaction at the last stage of reaction can generally be attained in about one hour if the reaction is begun at this temperature. If the reaction is begun at the lower temperature, it will take much longer time before the last stage of the reaction begins. On the contrary, if the temperature is higher than this, the reaction at the last stage will be so vigorous that it will be difficult to adjust both the temperature and pH. As to the temperature of the reaction mixture at the last stage of reaction, it is desirable to adjust it generally at 50–55°, because the higher temperature may be responsible for the possible destruction of streptomycin; and, on the other hand, at the lower temperature, much longer time will be required before the completion of reaction.

The streptomycin salt as a starting material for this invention is mostly sulfate, but such substances as streptomycin hydrochloride-calcium chloride double salt and streptomycin pentachlorophenate-sulfate double salt (H. Ikeda et al., J. Scientific Research Inst., Japan, vol. 46, 288, 1952), may also be used.

According to our invention, as stated above, by reacting an acid salt of streptomycin with amalgamated aluminum, the pH of the reaction mixture being maintained at 1.5–2.4 at the early stage of the reaction, and at 2.7–3.5 when the reaction has become vigorous during the process, dihydrodesoxystreptomycin with high purity and having great value as tuberculostatic agents can be manufactured with high yield.

The following examples illustrate methods of carrying out the present invention, but it is to be understood that these examples are given by way of illustration and not of limitation.

*Example I*

Six hundred and fifty grams of streptomycin sulfate (770 units/mg.) is dissolved in 1300 ml. of water. The pH of the solution is adjusted to 2.2 with 50% sulfuric acid and then 75 g. of amalgamated aluminum is added. The reaction mixture is agitated at 23° during which time the pH of the reaction mixture being adjusted to 2.2–2.3 (pH meter) with sulfuric acid. After about one hour, the reaction has become vigorous during the process and the temperature of the mixture advances abruptly and also the pH of the solution rises slowly. Therefore the temperature is kept at 53°–55° by cooling with cold water and the pH is maintained at 2.7–2.9 during more than one hour. At this time, the reaction has become mild, then the adjustment of the pH and the cooling of the mixture are stopped. After three hours from the beginning of reaction, the maltol test of the mixture shows no value, the pH of the solution shows 3.3, the amalgamated aluminum is almost dissolved away and the temperature of the mixture drops to room temperature.

After completion of the reduction, saturated aqueous barium hydroxide solution is slowly added to the reaction mixture to neutralize the pH of the solution and filtered. Filtrate and washings (7500 ml.) are concentrated in vacuo to volume 2200 ml. and again saturated barium hydroxide solution is slowly added to this concentrate to remove sulfate ion. The clear filtrate (4000 ml.) is then mixed with one volume of acetone and standing at room temperature overnight. The resulting white needle crystals of the free base of dihydrodesoxystreptomycin are filtered and dried in vacuo, weighting 470 g., yield 95%, M. P. (dec.) 195°, 1200 units/mg. (assayed biologically), $n_D^{20} = -102.5$ (c., 1% in water).

*Analysis.*—Calcd. for $C_{21}H_{41}N_7O_{11}$: C, 44.44; H, 7.28. Found: C, 44.32; H, 7.50.

*Example II*

Sixty-six grams of streptomycin hydrochloridecalcium chloride double salt (760 units/mg.) is dissolved in 130 ml. of water. The pH of the solution is adjusted to 2.2 with concentrated hydrochloric acid and 15 g. of amalgamated aluminum is then added. The reaction mixture is agitated sufficiently and the pH is maintained at 2.2–2.3. After about one and half hour the reaction has become vigorous during the process and the temperature of the mixture advances abruptly and also the pH of the solution rises slowly. Therefore the temperature is kept at 53°–55° by cooling with cold water and the pH is maintained at 2.7–3.0 during more than one hour. At this time, the reaction has become mild then the adjustment of the pH and the cooling of the mixture are stopped. After four hours from the beginning of reaction, the maltol test of the mixture shows no value, the pH shows 3.4 and the temperature of the mixture drops to 30°. After completion of the reaction, silver carbonate is added to the reaction mixture to neutralize the pH and then filtered. Filtrate and washings are concentrated in vacuo at 50°–55° to volume 250 ml. and again to this concentrate silver carbonate is added to remove chlor ion and final saturated aqueous barium hydroxide solution is added to remove carbonate ion. This clear filtrate is then mixed with one volume of acetone and standing at room temperature overnight. The resulting needle crystals of the free base of dihydrodesoxystreptomycin are filtered and dried in vacuo, weighing 45 g., yield 90%, 1210 units/mg. (assayed biologically), M. P. (dec.) 194°.

*Analysis.*—Calcd. for $C_{21}H_{41}N_7O_{11}$: C, 44.44; H, 7.28. Found: C, 44.09; H, 7.35.

*Example III*

Four hundred grams of streptomycin pentachlorophenate-sulfate double salt (425 units/mg.) is dissolved in the mixture of 800 ml. of n-butanol and 400 ml. of water and 26 g. of amalgamated aluminum is added. The reaction mixture is agitated sufficiently during which time the pH is maintained at 2.2–2.3 with 50% sulfuric acid. After about one and half hour agitation, the reaction has become vigorous during the process and the temperature of the mixture advances abruptly and also the pH of the solution rises slowly. Therefore the temperature is kept at 53°–55° by cooling with cold water and the pH is maintained at 2.7–2.9 during more than one and half hour.

At this time the reaction has become mild, then the adjustment of the pH and the cooling of the mixture are stopped. After four hours from the beginning of reaction, the maltol test of the mixture shows no value, the pH of the solution shows 3.4, amalgamated aluminum is almost dissolved and the temperature of the mixture drops to 30°.

After completion of the reaction, the reaction mixture is filtered and water layer is separated. To this aqueous layer thus obtained saturated aqueous barium hydroxide solution is slowly added and then filtered. Filtrate and washings are concentrated in vacuo at 50°–55° to volume 1000 ml. and again to this concentrate saturated aqueous barium hydroxide solution is added to remove sulfate ion. This clear filtrate is then mixed with one volume of acetone and standing at room temperature overnight. The resulting needle crystals of the free base of dihydrodesoxystreptomycin are filtered and dried in vacuo; weighing 157 g., yield 92.4%, 1200 units/mg. (assayed biologically).

*Analysis.*—Calcd. for $C_{21}H_{41}N_7O_{11}$: C, 44.44; H, 7.28. Found: C, 44.22; H, 7.52.

Modifications may be made in carrying out the present invention without departing from the spirit and scope thereof, and our invention is to be limited only by the appended claims.

We claim:

1. The process that comprises reacting an acid salt of streptomycin with amalgamated aluminum, the pH of the reaction mixture being maintained at 1.5–2.4 at the early stage of the reaction and at 2.7–3.5 when the reaction has become vigorous during the process, and then recovering the free base of dihydrodesoxystreptomycin from the reaction mixture.

2. The process that comprises reacting the aqueous solution of streptomycin sulfate with amalgamated aluminum, the pH of the reaction mixture being maintained at 1.5–2.4 at the early stage of the reaction and at 2.7–3.5 when the reaction has become vigorous during the process, and then recovering the free base of dihydrodesoxystremptomycin from the reaction mixture.

3. The process that comprises reacting the aqueous solution of streptomycin hydrochloride-calcium chloride double salt with amalgamated aluminum, the pH of the reaction mixture being maintained at 1.5–2.4 at the early stage of the reaction and at 2.7—3.5 when the reaction has become vigorous during the process, and then recovering the free base of dihydrodesoxystreptomycin from the reaction mixture.

4. The process that comprises reacting the solution of streptomycin pentachlorophenate-sulfate double salt in the mixture of n-butanol and water with amalgamated aluminum, the pH of the reaction mixture being maintained at 1.5–2.4 at the early stage of the reaction and at 2.7–3.5 when the reaction has become vigorous during the process, and then recovering the free base of dihydrodesoxystreptomycin from the reaction mixture.

References Cited in the file of this patent

UNITED STATES PATENTS 2,552,547    Fried et al. _____ May 15, 1951